US012769528B2

(12) United States Patent
Boskovic et al.

(10) Patent No.: US 12,769,528 B2
(45) Date of Patent: Oct. 20, 2026

(54) POST-DEPLOYMENT IMPACT DETECTION

(71) Applicant: Microsoft Technology Licensing, LLC, Redmond, WA (US)

(72) Inventors: Ljubica Vujovic Boskovic, Belgrade (RS); Maja Stikic Mraz, Belgrade (RS); Neda Pistinjat Nikolic, Belgrade (RS); Veljko Radoljub Vasic, Belgrade (RS)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 392 days.

(21) Appl. No.: 18/469,315

(22) Filed: Sep. 18, 2023

(65) Prior Publication Data

US 2025/0094148 A1 Mar. 20, 2025

(51) Int. Cl.
*G06F 8/60* (2018.01)
*G06F 11/34* (2006.01)

(52) U.S. Cl.
CPC ............ *G06F 8/60* (2013.01); *G06F 11/3495* (2013.01)

(58) Field of Classification Search
CPC ............................... G06F 8/60; G06F 11/3495
See application file for complete search history.

(56) References Cited

U.S. PATENT DOCUMENTS 8,417,811 B1 * 4/2013 Jenkins ............... G06F 11/3442 709/224
9,275,359 B1 * 3/2016 Fomin .................. G06F 16/254
11,354,216 B2 * 6/2022 Gardner .............. G06F 11/3006
2007/0130231 A1 * 6/2007 Brown ................ G06F 11/3409
2014/0282422 A1 * 9/2014 Tuffs .................. G06F 11/3428 717/127
2017/0010829 A1 * 1/2017 Chen ..................... G06F 3/0673
2018/0246945 A1 * 8/2018 Lee ..................... G06F 11/3476
2018/0300180 A1 10/2018 Shepard et al.
2019/0095470 A1 * 3/2019 Dundjerski ......... G06F 11/0793
2021/0019209 A1 * 1/2021 Krishnaswamy ... G06F 11/0772
2021/0200525 A1 * 7/2021 Shmouely ............. H04L 41/082

(Continued)

OTHER PUBLICATIONS

Imran Abdul Rauf "Dedicated SQL Pool vs. Serverless SQL-Comparison and Uses" Mar. 31, 2023 [retrieved Dec. 8, 2025], pp. 1-9, downloaded from the Wayback Machine at <url>:https://web.archive.org/web/20230331023106/https://www.royalcyber.com/blogs/dedicated-sql-pool-vs-serverless-sql/. (Year: 2023).*

(Continued)

*Primary Examiner* — S. Sough
*Assistant Examiner* — Stephen D Berman

(57) ABSTRACT

System, methods, apparatuses, and computer program products are disclosed for determining post-deployment impact of a deployment based on telemetry information. Telemetry information is analyzed to determine a periodic workload executing on one or more of a plurality of endpoints. Pre-deployment performance metrics and post-deployment performance metrics are then determined based on telemetry information generated before the deployment and after the deployment, respectively. The post-deployment impact of the deployment may then be determined by comparing the pre-deployment performance metrics and the post-deployment performance metrics. Actions may be performed based on the post-deployment impact.

17 Claims, 7 Drawing Sheets

(56) References Cited

U.S. PATENT DOCUMENTS

| | | | | |
|---|---|---|---|---|
| 2022/0004555 | A1* | 1/2022 | Kumar ................ | G06F 11/3452 |
| 2022/0283793 | A1 | 9/2022 | Demarne et al. | |

OTHER PUBLICATIONS

Guido Zuccon et al., "Query Variations and their Effect on Comparing Information Retrieval Systems," 2016 [retrieved Dec. 10, 2025], pp. 691-700, downloaded from <url>:https://dl.acm.org/doi/abs/10.1145/2983323.2983723. (Year: 2016).*

Jayanta Basak et al., "Storage Workload Identification", May 12, 2016 [retrieved Apr. 16, 2026], ACM Transactions on Storage (TOS), vol. 12, Issue 3, Article No. 14, pp. 1-30, downloaded from <url>:https://dl.acm.org/doi/abs/10.1145/2818716. (Year: 2016).*

Jiaqi Wang et al., "Real-time Workload Pattern Analysis for Large-scale Cloud Databases", Jul. 5, 2023 [retrieved Apr. 16, 2026], downloaded from <url>:https://arxiv.org/abs/2307.02626. (Year: 2023).*

Demarne, et al., "Reliability Analytics for Cloud Based Distributed Databases", Proceedings of the 2020 ACM SIGMOD International Conference on Management of Data, Jun. 11, 2020, pp. 1479-1492.

International Search Report Received in PCT Application No. PCT/US2024/042594, mailed on Nov. 20, 2024, 16 pages.

Zhang, et al., "Deploying a Steered Query Optimizer in Production at Microsoft", SIGMOD '22: Proceedings of the 2022 International Conference on Management of Data, Jun. 11, 2022, pp. 2299-2311.

International Preliminary Report on Patentability (Chapter I) received for PCT Application No. PCT/US2024/042594, mailed on Apr. 2, 2026, 10 pages.

* cited by examiner

500

600

POST-DEPLOYMENT IMPACT DETECTION

BACKGROUND

Flighting is a controlled and systematic measurement strategy for deployments that involves releasing new configurations, features, or deployments on a limited basis before a wider release. This approach allows developers to gather real-world data and performance metrics, enabling them to assess the impact and effectiveness of the changes. By progressively rolling out changes, flighting helps identify and address potential issues, and ensure the stability and quality of changes before a broader deployment.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

System, methods, apparatuses, and computer program products are disclosed for determining post-deployment impact of a deployment based on telemetry information. Telemetry information is analyzed to determine a periodic workload executing on one or more of a plurality of endpoints. Pre-deployment performance metrics and post-deployment performance metrics are then determined based on telemetry information generated before the deployment and after the deployment, respectively. The post-deployment impact of the deployment may then be determined by comparing the pre-deployment performance metrics and the post-deployment performance metrics. Actions may be performed based on the post-deployment impact.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
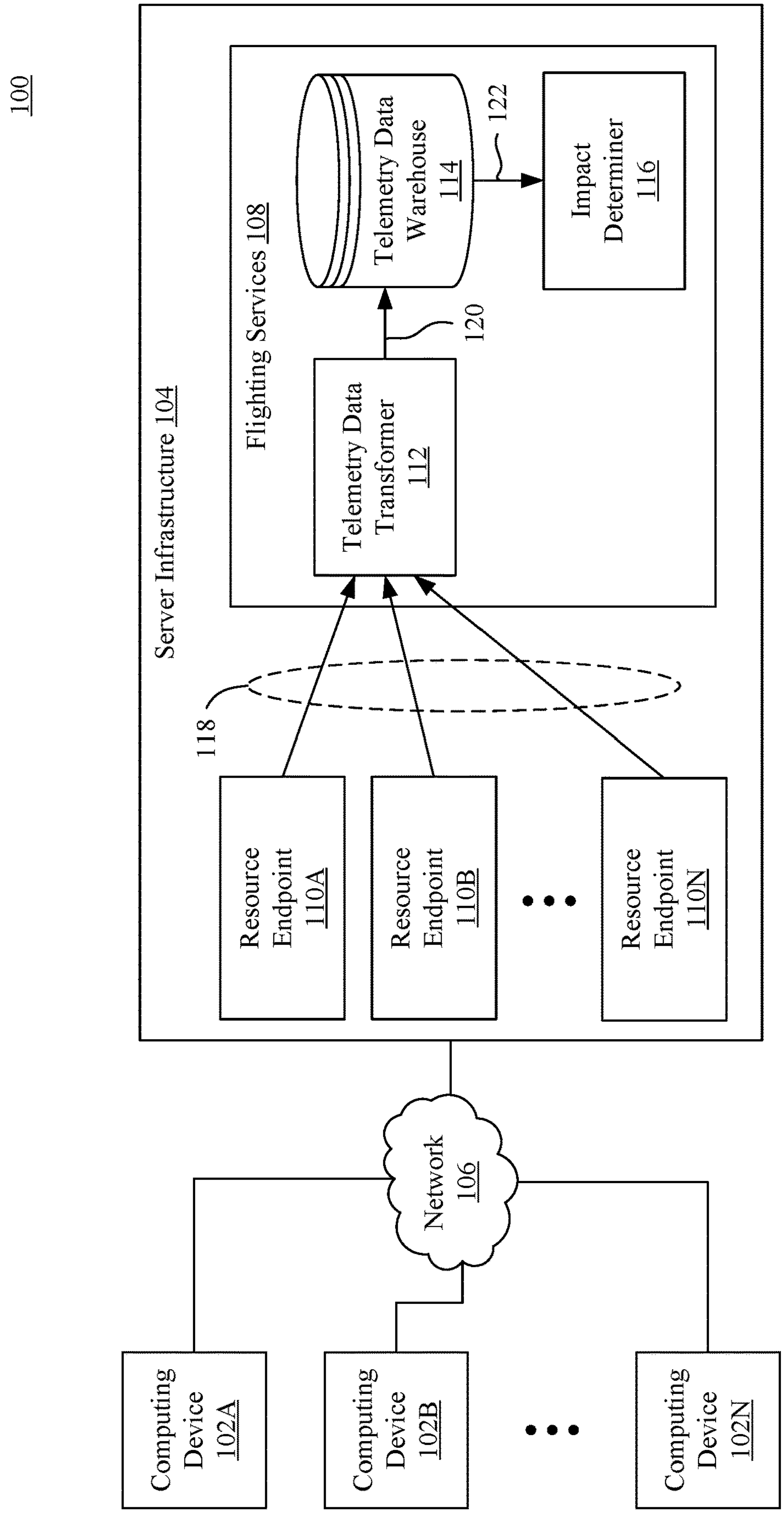
FIG. 1 shows a block diagram of an example system for determining a post-deployment impact, in accordance with an embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Embodiments disclosed herein relate to a scalable flighting framework for measuring the impact, both positive and negative, of changes, including, but not limited to, modifications to platform configurations, modifications to products and/or services, modifications to endpoints, modification to features, and/or modifications to deployments. Understanding the impact of the changes can provide quantitative and/or qualitative guidance on which configurations, features, and/or deployments can improve the customer experience and/or improve general cost of goods sold.

Currently, there is no scalable and reliable way to measure positive or negative impacts of deployments or isolated features on the workloads of customers. Pre-deployment benchmark testing may be used to detect regressions; however this may not detect regressions which are exposed only on a customer's actual workload. Pre-deployment benchmark tests can vary from customer's workload, and are often conducted in isolation from other workloads. In contrast, the flighting framework disclosed herein performs tests continuously on customers' workload in order to timely detect performance degradations.

Additionally, benchmark tests are typically configured with an expected performance and/or allowed variance thresholds that are determined empirically. Once determined, these thresholds need to be manually adjusted to ensure that they are up to date. In contrast, the flighting framework disclosed herein employs statistical tests that take into consideration median values and/or standard deviation values of signals before the change when determining the impact of the change. This adaptive approach obviates the need for manually updating the thresholds.

Currently, monitoring systems do not indicate early regression after deployment, which may result in increased impact to customers' workloads, and/or an increased number of incidents. Some post-deployment solutions have considered measurements of other metrics, such as, for example, query failures due to system errors and/or dumps. However, none of these solutions measure performance metrics or system-related metrics. Performance metrics are crucial for describing desirable customer experience, but, due to signal volatility, it is extremely hard to measure properly. For metrics related to query failures due to the system errors or dumps, the baseline, or desired value, is ideally zero, and any increase in these metrics over the baseline is a strong signal of regression. However, performance metrics are more nuanced. For example, queries of the same complexity performed over different datasets can have significantly different execution durations. As such, the execution duration by itself is a volatile signal that can be misleading.

Currently, there is no automated and scalable way to measure the impact of changes on resource utilization metrics. In addition to performance metrics, the flighting framework disclosed herein can measure utilization metrics, such as, but not limited to, CPU (central processing unit) and/or memory utilization backend and frontend applications. These utilization metrics can provide insights on the utilizing of resources given to specific endpoints, and/or indicate early regressions that cannot be gleaned from other metrics.

Additionally, the impact of particular features on performance metrics cannot be observed in isolation, making it hard to quantify the benefits of such features.

Embodiments disclosed herein leverage telemetry information associated with periodic workloads to determine the impact of changes. Many customers who have structured query language (SQL) workloads perform the same or very similar SQL queries with regular cadence, including, but not limited to, an hourly, daily, weekly, and/or less often frequency. Most of these periodic workloads are crucial to the customer. For example, a customer may refresh Power BI® reports on a periodic basis to output reports used directly by decision makers. Another example includes automated pipelines for transforming and/or preparing data for analytics. For example, data can be surfaced with Power BI® tools, and/or used for data science analysis, and/or machine learning models. Such periodic workloads are very important and critical to the customer. In embodiments disclosed herein, a flighting framework leverages periodicity of workload by performing performance analyses only on endpoints with periodic workloads. A periodic workload may include, but is not limited to, queries, requests, and/or portions thereof, that have similar complexities, that repeat at a threshold periodicity, and that operate on data satisfying a similarity threshold. In embodiments, the complexity of queries or requests may be compared based on, for example, but not limited to, hashes of the queries or requests, identifiers associated with the workload, queries and/or requests, and/or the like. For example, queries associated with the same or identical query hash values have the same query complexity. In embodiments, data similarity may be determined based on the size and/or type of data. For example, data varying by less than a threshold size (e.g., 10 MB) will be considered similar. Periodic workloads are good candidates for observing the impact or effects of any change because they are executed before and after the change, operate on similar amounts of the data, and have the same or similar query complexities (e.g., share the same distributed query hash).

In embodiments disclosed herein, the flighting framework may conduct tests on endpoints at varying degrees of granularity. For example, metrics may be defined and/or calculated for all endpoints worldwide, and/or a specific subset of endpoints, such as, but not limited to, endpoints belonging to a particular ring and/or region. Furthermore, in embodiment, metrics may be defined and/or calculated at the endpoint level. This allows for A/B testing to provide a greater understanding of the impact of specific features that may be bundled together with other features in a single deployment.

In embodiments disclosed herein, the flighting framework may measure various metrics, including, but not limited to, query duration, query success rate, login success rate, memory utilization of frontend and/or backend applications assigned to an endpoint, CPU utilization of frontend and/or backend applications assigned to an endpoint, and/or the like. However, the flighting framework may be modified to support additional metrics of interest.

In embodiments disclosed herein, the flighting framework may automatically conclude processing when it determines that a change is generally significant based on the impact of the change on a plurality of endpoints.

While embodiments described herein relate to SQL workloads, these techniques can be applied to other types of workloads if the comparability of the workloads can be determined using, for example, but not limited to, an identifier, hash value, complexity score, data size, data type, similarity score, and/or the like.

These and further embodiments are disclosed herein that enable the functionality described above and further such functionality. Such embodiments are described in further detail as follows.

For instance, FIG. 1 shows a block diagram of an example system 100 for determining a post-deployment impact, in accordance with an embodiment. As shown in FIG. 1, system 100 includes one or more computing devices 102A, 102B, and 102N (collectively referred to as "computing devices 102A-102N"), and a server infrastructure 104. Computing devices 102A-102N, and server infrastructure 104 are communicatively coupled to each other via network 106. Network 106 may comprise one or more networks such as local area networks (LANs), wide area networks (WANs), enterprise networks, the Internet, etc., and may include one or more wired and/or wireless portions. System 100 is described in further detail as follows.

Server infrastructure 104 may be a network-accessible server set (e.g., a cloud-based environment or platform). As shown in FIG. 1, server infrastructure 104 includes flighting services 108, and first-third resource endpoints 110A, 110B, and 110N (collectively referred to as "resource endpoints 110A-110N"). Flighting services 108 further includes a telemetry data transformer 112, a telemetry data warehouse 114, and an impact determiner 116. Resource endpoints 110A-110N are collections of resources and/or functionalities of server infrastructure 104, including, but not limited to, virtual machines, web applications, APIs, databases, and/or the like. In an embodiment, the underlying resources and/or functionalities of resource endpoints 110A-110N may be co-located (e.g., housed in one or more nearby buildings with associated components such as backup power supplies, redundant data communications, environmental controls, etc.) to form a datacenter, may be distributed across different regions, and/or may be arranged in other manners. In accordance with an embodiment, system 100 comprises part of the Microsoft® Azure® cloud computing platform, owned by Microsoft Corporation of Redmond, Washington, although this is only an example and not intended to be limiting.

Flighting services 108 is configured to manage resource endpoints 110A-110N, including, but not limited to, analyzing telemetry data associated with resource endpoints 110A-110N, determining the impact of changes to resource endpoint(s) 110A-110N, generate graphs, charts, reports, and/or other information related to the impact of changes to resource endpoint(s) 110A-110N, and/or to change, update, and/or otherwise modify configurations, features, and/or deployments of resource endpoint(s) 110A-110N. Flighting services 108 may be incorporated as a service executing on a computing device of server infrastructure 104. Alternatively, flighting services 108 (or a subservice thereof) may be incorporated as a service executing on a computing device external to server infrastructure 104. Flighting services 108 is described in greater detail below in conjunction with FIG. 2.

Telemetry data transformer 112 is configured to receive, from resource endpoint(s) 110A-110N, raw telemetry information 118 including, but not limited to, telemetry information from a SQL telemetry service. In embodiments, telemetry data transformer 112 may receive raw telemetry information 118 directly from resource endpoint(s) 110A-110N. In other embodiments, telemetry data transformer 112 may receive raw telemetry information 118 from a telemetry agent that collects raw telemetry information 118 from resource endpoint(s) 110A-110N. Telemetry data transformer 112 is further configured to transform raw telemetry information 118 into transformed telemetry data 120. In embodiments, telemetry data transformer 112 may convert, structure, and/or refine raw telemetry data. Transformations performed by telemetry data transformer 112 may include, but are not limited to, data aggregation, normalization, filtering, enrichment, obfuscation, and/or correlation. Such transformations transform raw telemetry information 118 into a format that is readily usable by impact determiner 116, and improves the performance and efficiency of impact determiner 116. Telemetry data transformer 112 is further configured to store transformed telemetry data 120 in telemetry data warehouse 114.

Telemetry data warehouse 114 is configured to store, organize, and/or manage telemetry data received from various sources, such as, but not limited to, server infrastructure 104, resource endpoints 110A-110N, telemetry data transformer 112, impact determiner 116 and/or components thereof. In embodiments, telemetry data warehouse 114 may consolidate and/or retain historical telemetry information for extended periods in order to facilitate functionality of impact determiner 116, including, but not limited to, in-depth analysis, trend identification, and/or pattern recognition. In embodiments, telemetry data warehouse 114 may store raw telemetry information 118 and/or transformed telemetry data 120 in various formats, such as, but not limited to, structured and/or unstructured data.

Impact determiner 116 is configured to determine the impact of changes on resource endpoint(s) 110A-110N. In embodiments, impact determiner 116 may receive telemetry data 122 from data warehouse 114, and analyze telemetry data 122 to identify periodic workloads executing on resource endpoint(s) 110A-110N. As discussed above, a periodic workload may include, but is not limited to, queries or requests of similar or identical complexities that repeat at a threshold periodicity, and that process data satisfying a similarity threshold. In embodiments, impact determiner 116 may analyze telemetry data 122 to identify queries that are associated with the same or identical query hash value, that are associated with query timestamps that satisfy a relationship with periodicity threshold (e.g., period of one day), and that operate on data that satisfy a similarity threshold.

After identifying a periodic workload, impact determiner 116 may, in embodiments, analyze telemetry data associated with the identifier periodic workload to determine pre-deployment performance metric values and post-deployment performance metric values. In embodiments, performance metric values may be associated with one or more metrics, including, but not limited to, query duration, query success rate, login success rate, memory utilization of frontend and/or backend applications assigned to an endpoint, CPU utilization of frontend and/or backend applications assigned to an endpoint, and/or the like. Pre-deployment performance metric values may be determined based on telemetry data generated prior to, and/or associated with timestamps occurring prior to, the deployment of a change. Post-deployment performance metric values may be determined based on telemetry data generated after, and/or associated with timestamps occurring after, the deployment of the change. In embodiments, the time period(s) associated with the pre-deployment performance metric values and/or the post-deployment performance metric values is manually, semi-automatically, automatically, and/or dynamically configurable. For example, a period of time (e.g., 2 hours) after deployment of the change may be excluded from the analysis in order to exclude telemetry data that may be affected by process and/or application restarts associated with the deployment. In embodiments, a user (e.g., software developer) may provide parameters to impact determiner 116 that may be used to determine the time period(s), including, but not limited to, a pre-deployment time window, a post-deployment time window, a deployment time, a post-deployment exclusion window, and/or the like.

In embodiments, impact determiner 116 may determine one or more impacts of deploying a change by comparing pre-deployment performance metric values and the post-deployment performance metric values associated with periodic workloads executing on resource endpoint(s) 110A-110N. In embodiments, impact determiner 116 may determine the impact of deploying the change on each of a subset of resource endpoint(s) 110A-110N by performing such comparisons at the resource endpoint level for each of the subset of resource endpoint(s) 110A-110N. In embodiments, impact determiner 116 may determine an overall or general impact of deploying the change to the subset of resource endpoint(s) 110A-110N based on the impact of deploying the change to each of the subset of resource endpoint(s) 110A-110N. For instance, impact determiner 116 may determine that deploying the change has a positive impact on a majority of the subset of resource endpoint(s) 110A-110N and infer that the deployment has an overall positive impact. In embodiments, impact determiner 116 may determine the impact of a particular feature of a deployment that bundles a plurality of features by comparing the post-deployment impacts of deployments that differ only in the particular feature. Such A/B testing allows impact determiner 116 to isolate features of a deployment to determine the impact of any particular feature. Impact determiner 116 is described in greater detail below in conjunction with FIG. 2.

Computing devices 102A-102N may each be any type of stationary or mobile processing device, including, but not limited to, a desktop computer, a server, a mobile or handheld device (e.g., a tablet, a personal data assistant (PDA), a smart phone, a laptop, etc.), an Internet-of-Things (IoT)

device, etc. Each of computing devices 102A-102N stores data and executes computer programs, applications, and/or services.

Users are enabled to utilize the applications and/or services (e.g., flighting service 108 and/or subservices thereof, services executing on resource endpoints 110A-110N) offered by the network-accessible server set via computing devices 102A-102N. For example, a user may be enabled to utilize the applications and/or services offered by the network-accessible server set by signing-up with a cloud services subscription with a service provider of the network-accessible server set (e.g., a cloud service provider). Upon signing up, the user may be given access to a portal of server infrastructure 104, not shown in FIG. 1. A user may access the portal via computing devices 102A-102N (e.g., by a browser application executing thereon). For example, the user may use a browser executing on computing device 102A to traverse a network address (e.g., a uniform resource locator) to a portal of server infrastructure 104, which invokes a user interface (e.g., a web page) in a browser window rendered on computing device 102A. The user may be authenticated (e.g., by requiring the user to enter user credentials (e.g., a username, password, PIN, etc.)) before being given access to the portal.

Upon being authenticated, the user may utilize the portal to perform various cloud management-related operations (also referred to as "control plane" operations). Such operations include, but are not limited to, creating, deploying, allocating, modifying, and/or deallocating (e.g., cloud-based) compute resources; building, managing, monitoring, and/or launching applications (e.g., ranging from simple web applications to complex cloud-based applications); configuring resource endpoint(s) 110A-110N to provide a particular service (e.g., a database server, OLAP (Online Analytical Processing) server, etc.), submitting queries (e.g., SQL queries) to databases of server infrastructure 104; etc. Examples of compute resources include, but are not limited to, virtual machines, virtual machine scale sets, clusters, ML workspaces, serverless functions, storage disks (e.g., maintained by storage node(s) of server infrastructure 104), web applications, database servers, data objects (e.g., data file(s), table(s), structured data, unstructured data, etc.) stored via the database servers, etc. The portal may be configured in any manner, including being configured with any combination of text entry, for example, via a command line interface (CLI), one or more graphical user interface (GUI) controls, etc., to enable user interaction.

Figure 2:
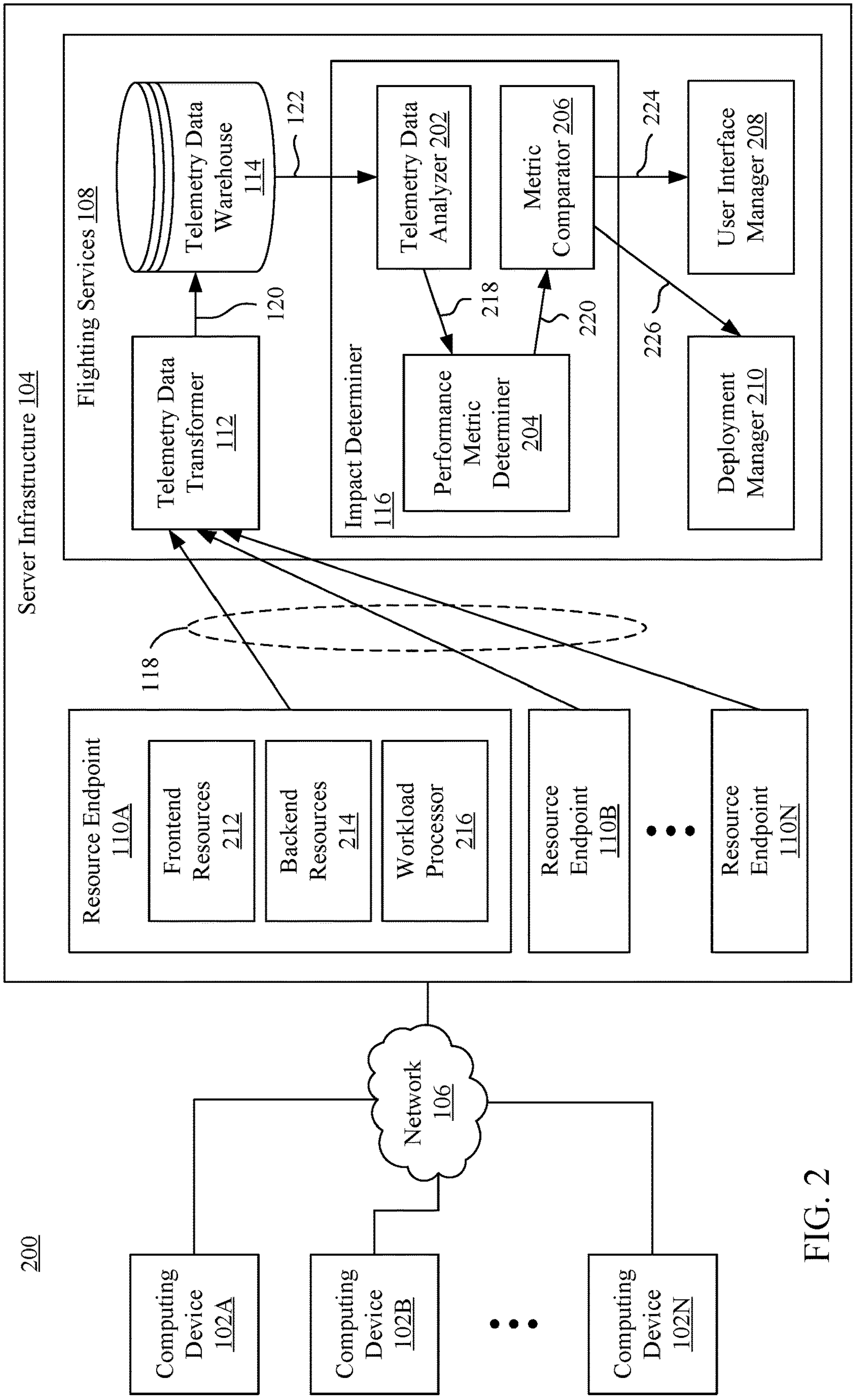
FIG. 2 shows a block diagram of an example system for determining a post-deployment impact, in accordance with an embodiment.

Embodiments described herein may operate in various ways to determine the impact of a change. For instance, FIG. 2 shows a block diagram of an example system 200 for determining a post-deployment impact, in accordance with an embodiment. As shown in FIG. 2, system 200 includes computing device(s) 102A-102N, server infrastructure 104, network 106, flighting services 108, resource endpoint(s) 110A-110N, telemetry data transformer 112, telemetry data warehouse 114, and impact determiner 116, as shown FIG. 1. In system 200, impact determiner 116 further includes a telemetry data analyzer 202, a performance metric determiner 204, and a metric comparator 206. Furthermore, flighting services 108 further includes a user interface (UI) manager 208, and a deployment manager 210. Additionally, resource endpoint 110A may further include frontend resources 212, backend resources 214, and a workload manager 216. System 200 is described in further detail as follows.

Telemetry data analyzer 202 is configured to receive telemetry data 122 from telemetry data warehouse 114, and analyze telemetry data 122 to identify periodic workloads executing on resource endpoint(s) 110A-110N. As discussed above, a periodic workload may include, but is not limited to, queries or requests of similar or identical complexities that repeat at a threshold periodicity, and that process data satisfying a similarity threshold. In embodiments, telemetry data analyzer 202 may analyze telemetry data 122 to identify queries that are associated with the same or identical query hash value, that are associated with query timestamps that satisfy a relationship with a periodicity threshold (e.g., period of one day), and that operate on data that satisfy a similarity threshold. After identifying a periodic workload, telemetry data analyzer 202 may, in embodiments, provide telemetry data associated with the identified periodic workload, referred to herein as, workload telemetry data 218, to performance metric determiner 208.

Performance metric determiner 208 is configured to receive workload telemetry data 218 from telemetry data analyzer 202, and determine pre-deployment performance metric values and post-deployment performance metric values based on workload telemetry data 218. In embodiments, performance metric values may be associated with one or more metrics, including, but not limited to, query duration, query success rate, login success rate, memory utilization of frontend and/or backend applications assigned to an endpoint, CPU utilization of frontend and/or backend applications assigned to an endpoint, and/or the like. As discussed above, pre-deployment performance metric values may be determined based on telemetry data generated prior to, and/or associated with timestamps occurring prior to, the deployment of a change, and post-deployment performance metric values may be determined based on telemetry data generated after, and/or associated with timestamps occurring after, the deployment of the change. In embodiments, the time period(s) associated with the pre-deployment performance metric values and/or the post-deployment performance metric values is manually, semi-automatically, automatically, and/or dynamically configurable. In embodiments, a user (e.g., software developer) may provide parameters to impact determiner 116 that may be used to determine the time period(s), including, but not limited to, a pre-deployment time window, a post-deployment time window, a deployment time, a post-deployment exclusion window, and/or the like. In embodiments, performance metric determiner 208 may provide the pre-deployment performance metric values and post-deployment performance metric values to metric comparator 206 as performance metric values 220.

Metric comparator 206 is configured to receive performance metric values 220 from performance metric determiner 204, and analyze performance metric values 220 to determine the impact of deploying a change on resource endpoint(s) 110A-110N. In embodiments, metric comparator 206 may determine one or more impacts of deploying a change by comparing pre-deployment performance metric values and the post-deployment performance metric values associated with periodic workloads executing on resource endpoint(s) 110A-110N. For instance, metric comparator 206 may, in embodiments, determine the impact of deploying the change on each of a subset of resource endpoint(s) 110A-110N by performing such comparisons at the resource endpoint level for each of the subset of resource endpoint(s) 110A-110N. Additionally, metric comparator 206 may, in embodiments, determine an overall or general impact of deploying the change to the subset of resource endpoint(s) 110A-110N based on the impact of deploying the change to each of the subset of resource endpoint(s) 110A-110N.

Moreover, metric comparator 206 may, in embodiments, determine that deploying the change has a positive impact on a majority of the subset of resource endpoint(s) 110A-110N and infer that the deployment has an overall positive impact. Furthermore, metric comparator 206 may, in embodiments, determine the impact of a particular feature of a deployment that bundles a plurality of features by comparing the post-deployment impacts of deployments that differ only in the particular feature. Such A/B testing allows metric comparator 206 to isolate features of a deployment to determine the impact of any particular feature. Additionally, metric comparator 206 may, in embodiments, identify patterns and/or trends in performance metric values 220 using one or more data analysis techniques, including, but not limited to, data mining, machine learning, statistical analysis, exploratory data analysis (EDA), hypothesis testing, regression analysis, time-series analysis, clustering (e.g., k-means clustering), anomaly detection, and/or the like. In embodiments, metric comparator 206 may provide impact determinations 224 and/or 226 to UI manager 208 and/or deployment manager 210, respectively. In embodiments, impact determinations 224 and 226 may be identical, or may differ from one another.

UI manager 208 is configured to receive impact determinations 224 from metric comparator 206, generate UI elements based on impact determinations 224, and provide the generated UI elements (not shown) to a user (e.g., software developer). In embodiments, the generated UI elements may include, but are not limited to, textual information, graphical information, multimedia information, infographics, graphs, charts, reports, and/or the like, to convey the information, such as, but not limited to, granular (e.g., resource endpoint-level) impact information, global or worldwide impact information, regional impact information, trend information, pattern information, frontend resource utilization information, backend resource utilization information, application-level resource utilization information, performance metric values 220, and/or the like, to the user (e.g., software developer). The information conveyed through the generated UI elements empower the user (e.g., software developer) to understand the impact of changes to configurations, features, and/or deployments on resource endpoint(s) 110A-110N. This understanding allows the user (e.g., software developer) to adjust, modify, and/or change configurations, features, and/or deployments, including, but not limited to, undeploying deployments that may have a negative impact, pushing configurations, features, and/or deployments that have a positive or neutral impact to additional resource endpoint(s) 110A-110B, updating deployments to include configurations and/or features that are determined to have a positive or neutral impact, and/or the like.

Deployment manager 210 is configured to receive impact determinations 226 from comparator 206, and manage configurations, features, and/or deployments associated with resource endpoint(s) 110A-110N based on impact determinations 226. In embodiments, deployment manager 210 may operate automatically without user input, or semi-automatically by prompting the user (e.g., administrator) to alter or modify configurations, features, and/or deployments associated with resource endpoint(s) 110A-110N. In embodiments, deployment manager 210 may provide instructions and/or commands to resource endpoint(s) 110A-110N to adjust, modify, and/or change configurations, features, and/or deployments, including, but not limited to, undeploying deployments that may have a negative impact, pushing configurations, features, and/or deployments that have a positive or neutral impact to additional resource endpoint(s) 110A-110B, updating deployments to include configurations and/or features that are determined to have a positive or neutral impact, and/or the like.

Figure 3:
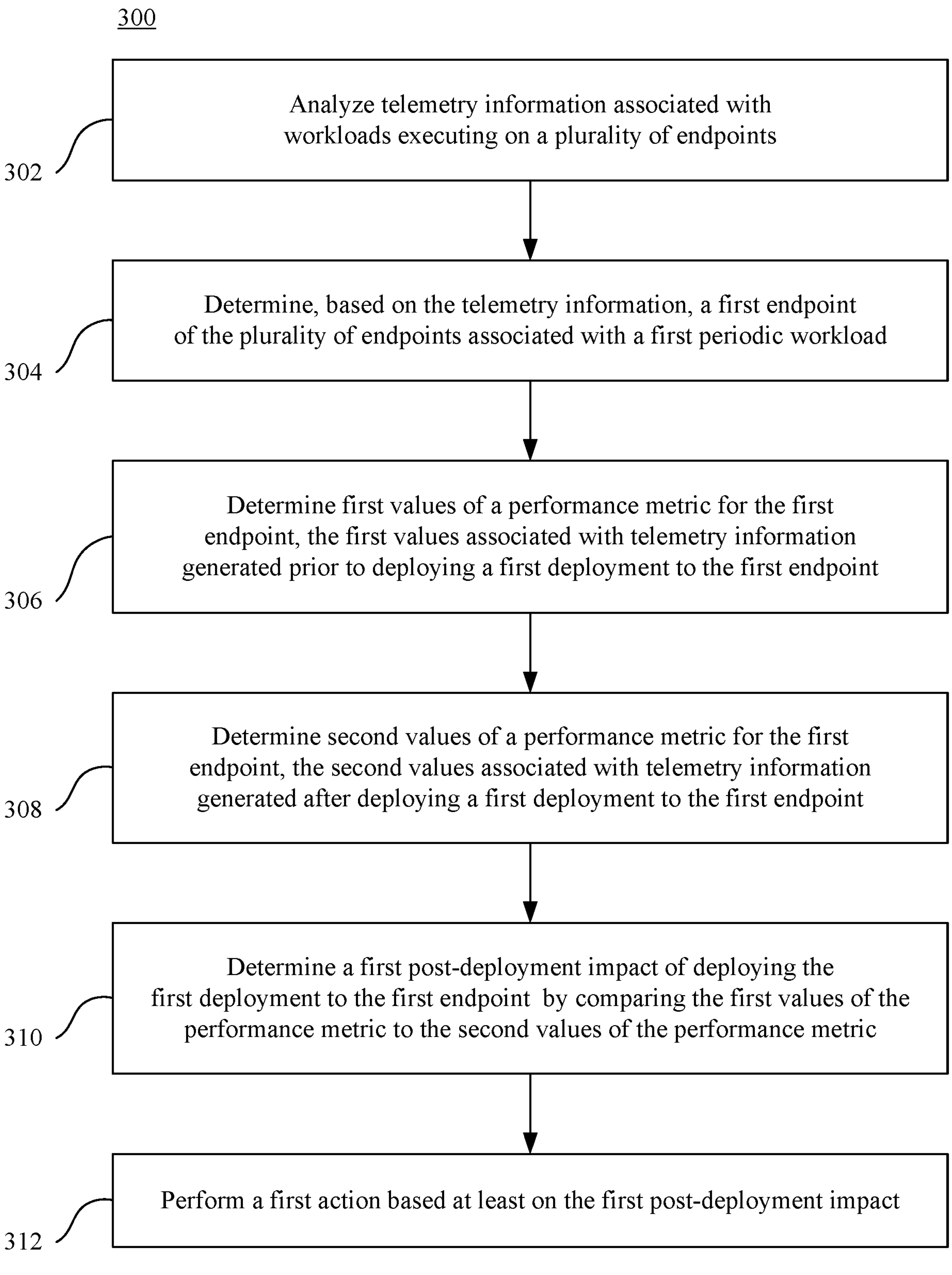
FIG. 3 depicts a flowchart of a process for determining a post-deployment impact, in accordance with an embodiment.

Embodiments described herein may operate in various ways to determine a post-deployment impact. For instance, FIG. 3 depicts a flowchart 300 of a process for determining a post-deployment impact, in accordance with an embodiment. Server infrastructure 104, flighting services 108, impact determiner 116, telemetry data analyzer 202, performance metric determiner 204, metric comparator 206, UI manager 208, and/or deployment manager 210 of FIGS. 1 and 2 may operate according to flowchart 300, for example. Note that not all steps of flowchart 300 may need to be performed in all embodiments, and in some embodiments, the steps of flowchart 300 may be performed in different orders than shown. Flowchart 300 is described as follows with respect to FIGS. 1 and 2 for illustrative purposes.

Flowchart 300 starts at step 302. In step 302, telemetry information associated with workloads executing on a plurality of endpoints is analyzed. For example, telemetry data analyzer 202 of impact determiner 116 may analyze telemetry data 122 associated with workloads executing on resource endpoint(s) 110A-110N.

In step 304, a first endpoint of the plurality of endpoints associated with a first periodic workload is determined based on the telemetry information. For example, telemetry data analyzer 202 may determine a first resource endpoint associated with a first periodic workload. As discussed above, a periodic workload may include, but is not limited to, queries or requests of similar or identical complexities that repeat at a threshold periodicity, and that process data satisfying a similarity threshold. In embodiments, telemetry data analyzer 202 may analyze telemetry data 122 to identify queries that are associated with the same or identical query hash value, that are associated with query timestamps that satisfy a relationship with a periodicity threshold (e.g., period of one day), and that operate on data that satisfy a similarity threshold.

In step 306, first values of a performance metric are determined for the first endpoint, the first values associated with telemetry information generated prior to deploying a first deployment to the first endpoint. For example, performance metric determiner 204 may determine pre-deployment performance metric values associated with the first resource endpoint. As discussed above, pre-deployment performance metric values may be determined based on telemetry data generated prior to, and/or associated with timestamps occurring prior to, the deployment of a change. In embodiments, performance metric determiner 204 may provide the pre-deployment performance metric values to metric comparator 206 as part of performance metric values 220.

In step 308, second values of the performance metric are determined for the first endpoint, the second values associated with telemetry information generated after deploying the first deployment to the first endpoint. For example, performance metric determiner 204 may determine post-deployment performance metric values associated with the first resource endpoint. As discussed above, post-deployment performance metric values may be determined based on telemetry data generated after, and/or associated with timestamps occurring after, the deployment of the change. In embodiments, performance metric determiner 204 may provide the post-deployment performance metric values to metric comparator 206 as part of performance metric values 220.

In step 310, a first post-deployment impact of deploying the first deployment is determined to the first endpoint by comparing the first values of the performance metric to the second values of the performance metric. For example, metric comparator 206 may determine the impact of deploying the change to the first resource endpoint by comparing the pre-deployment performance metric values and the post-deployment performance metric values associated with the first resource endpoint. In embodiments, metric comparator 206 may provide the determined impact to UI manager 208 and/or deployment manager 210 as impact determinations 224 and/or 226, respectively.

In step 312, a first action is performed based on the first post-deployment impact. For example, UI manager 208 and/or deployment manager 210 may perform an action based on impact determinations 224 and/or 226, respectively. As discussed above, UI manager 208 may, based on impact determinations 224, generate and provide UI elements to a user (e.g., software developer) to convey information, such as, but not limited to, textual information, graphical information, multimedia information, infographics, graphs, charts, reports, granular (e.g., resource endpoint-level) impact information, global or worldwide impact information, regional impact information, trend information, pattern information, frontend resource utilization information, backend resource utilization information, application-level resource utilization information, performance metric values 220, and/or the like. As discussed above, deployment manager 210 may, responsive to impact determinations 226, provide instructions and/or commands to resource endpoint (s) 110A-110N to adjust, modify, and/or change configurations, features, and/or deployments, including, but not limited to, undeploying deployments that may have a negative impact, pushing configurations, features, and/or deployments that have a positive or neutral impact to additional resource endpoint(s) 110A-110B, updating deployments to include configurations and/or features that are determined to have a positive or neutral impact, and/or the like.

Figure 4:
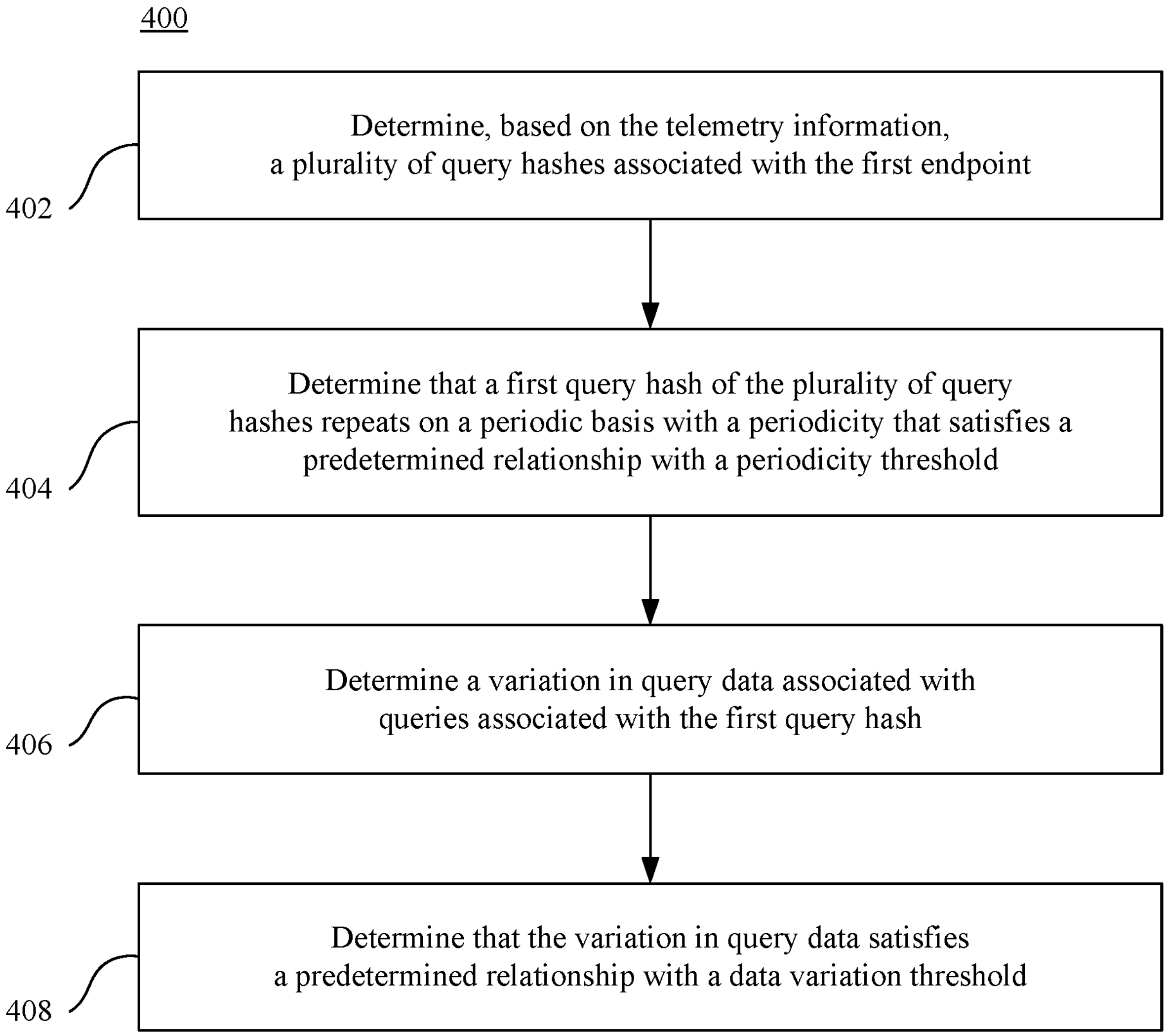
FIG. 4 depicts a flowchart of a process for identifying a periodic workload, in accordance with an embodiment.

Embodiments described herein may operate in various ways to identify a periodic workload. For instance, FIG. 4 depicts a flowchart 400 of a process for identifying a periodic workload, in accordance with an embodiment. Server infrastructure 104, flighting services 108, impact determiner 116, and/or telemetry data analyzer 202 of FIGS. 1 and 2 may operate according to flowchart 400, for example. Note that not all steps of flowchart 400 may need to be performed in all embodiments, and in some embodiments, the steps of flowchart 400 may be performed in different orders than shown. Flowchart 400 is described as follows with respect to FIGS. 1 and 2 for illustrative purposes.

Flowchart 400 starts at step 402. In step 402, a plurality of query hashes associated with the first endpoint are determined based on the telemetry information. For example, telemetry data analyzer 202 of impact determiner 116 may analyze telemetry data 122 to identify query hash values associated with queries executed by a first resource endpoint.

In step 404, it is determined that a first query hash of the plurality of query hash values repeats on a periodic basis with a periodicity that satisfies a predetermined relationship with a periodicity threshold. For example, telemetry data analyzer 202 may determine a common query hash value associated with a plurality of queries executed by the first resource endpoint, and analyze timestamp information associated with the plurality of queries to determine whether the periodicity of the plurality of queries satisfies a relationship with a periodicity threshold.

In step 406, a variation in query data associated with queries associated with the first query hash are determined. For example, telemetry data analyzer 202 may determine data size values associated with the plurality of queries associated with the common query hash value, and determine a variance of the data size values. In embodiments, the variance may be determined as, for example, but not limited to, an absolute difference between two or more data size values, a percentage difference between two or more data size values, an absolute difference between one or more data size values and an average or mean data size value, a percentage difference between one or more data size values and an average or mean data size value, a standard deviation, and/or the like.

In step 408, it is determined that the variation in the query data satisfies a predetermined relationship with a data variation threshold. For example, telemetry data analyzer 202 may determine that the variance is less than a data variation threshold. In embodiments, telemetry data analyzer 202 may determine that a plurality of queries satisfies a data variation threshold when the data size values associated with the plurality of queries differ from one another by less than a threshold size (e.g., 10 MB). In embodiments, telemetry data analyzer 202 may determine that a plurality of queries satisfies a data variation threshold when a standard deviation of the data size values associated with the plurality of queries is less than a threshold standard deviation (e.g., 0.5 standard deviations).

Figure 5:
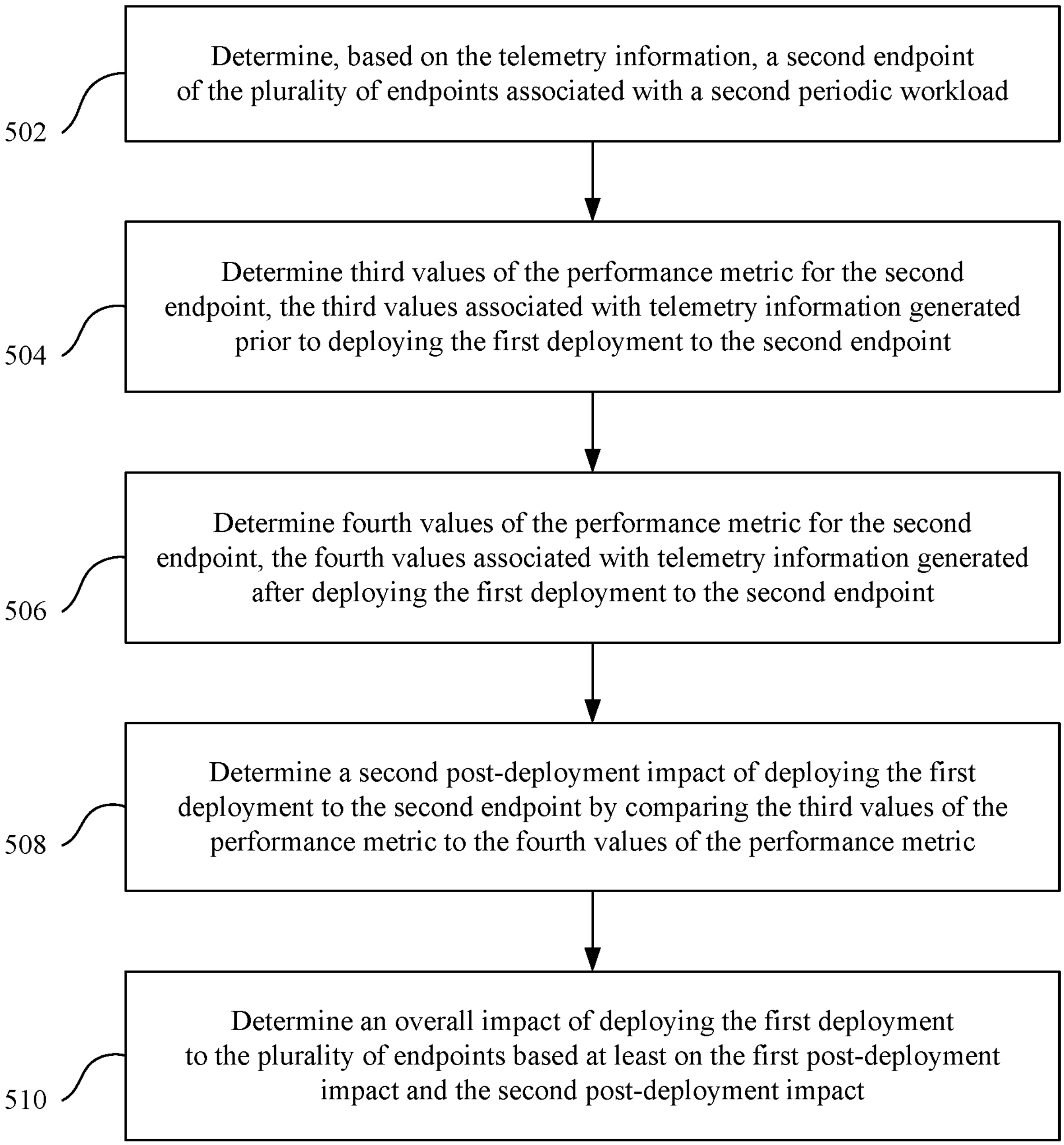
FIG. 5 depicts a flowchart of a process for determining an overall impact of deploying a deployment on a plurality of endpoints, in accordance with an embodiment.

Embodiments described herein may operate in various ways to determine an overall impact of deploying a deployment on a plurality of endpoints. For instance, FIG. 5 depicts a flowchart 500 of a process for determining an overall impact of deploying a deployment on a plurality of endpoints, in accordance with an embodiment. Server infrastructure 104, flighting services 108, impact determiner 116, telemetry data analyzer 202, performance metric determiner 204, and/or metric comparator 206 of FIGS. 1 and 2 may operate according to flowchart 500, for example. Note that not all steps of flowchart 500 may need to be performed in all embodiments, and in some embodiments, the steps of flowchart 500 may be performed in different orders than shown. Flowchart 500 is described as follows with respect to FIGS. 1 and 2 for illustrative purposes.

Flowchart 500 starts at step 502. In step 502, a second endpoint of the plurality of endpoints associated with a second periodic workload is determined based on the telemetry information. For example, telemetry data analyzer 202 may determine a second resource endpoint associated with a second periodic workload. As discussed above, a periodic workload may include, but is not limited to, queries or requests of similar or identical complexities that repeat at a threshold periodicity, and that process data satisfying a similarity threshold. In embodiments, telemetry data analyzer 202 may analyze telemetry data 122 to identify queries that are associated with the same or identical query hash value, that are associated with query timestamps that satisfy a relationship with a periodicity threshold (e.g., period of one day), and that operate on data that satisfy a similarity threshold.

In step 504, third values of a performance metric are determined for the second endpoint, the third values associated with telemetry information generated prior to deploying a first deployment to the second endpoint. For example, performance metric determiner 204 may determine pre-deployment performance metric values associated with the second resource endpoint. As discussed above, pre-deployment performance metric values may be determined based on telemetry data generated prior to, and/or associated with timestamps occurring prior to, the deployment of a change. In embodiments, performance metric determiner 204 may provide the pre-deployment performance metric values to metric comparator 206 as part of performance metric values 220.

In step 506, fourth values of a performance metric are determined for the second endpoint, the fourth values associated with telemetry information generated after deploying a first deployment to the second endpoint. For example, performance metric determiner 204 may determine post-deployment performance metric values associated with the second resource endpoint. As discussed above, post-deployment performance metric values may be determined based on telemetry data generated after, and/or associated with timestamps occurring after, the deployment of a change. In embodiments, performance metric determiner 204 may provide the post-deployment performance metric values to metric comparator 206 as part of performance metric values 220.

In step 508, a second post-deployment impact of deploying the first deployment to the second resource endpoint is determined by comparing the third values of the performance metric to the fourth values of the performance metric. For example, metric comparator 206 may determine the impact of deploying the change to the second resource endpoint by comparing the pre-deployment performance metric values and the post-deployment performance metric values associated with the second resource endpoint.

In step 510, an overall impact of deploying the first deployment to the plurality of endpoints is determined based at least on the first post-deployment impact and the second post-deployment impact. For example, metric comparator 206 may determine an overall or general impact of deploying the change to a plurality of resource endpoints based on the impact of deploying the change to the first resource endpoint and the impact of deploying the change to the second resource endpoint. For example, in embodiments, metric comparator 206 may determine that deploying the change has an overall positive impact when the change has a positive impact on a threshold number of the plurality of resource endpoint.

Figure 6:
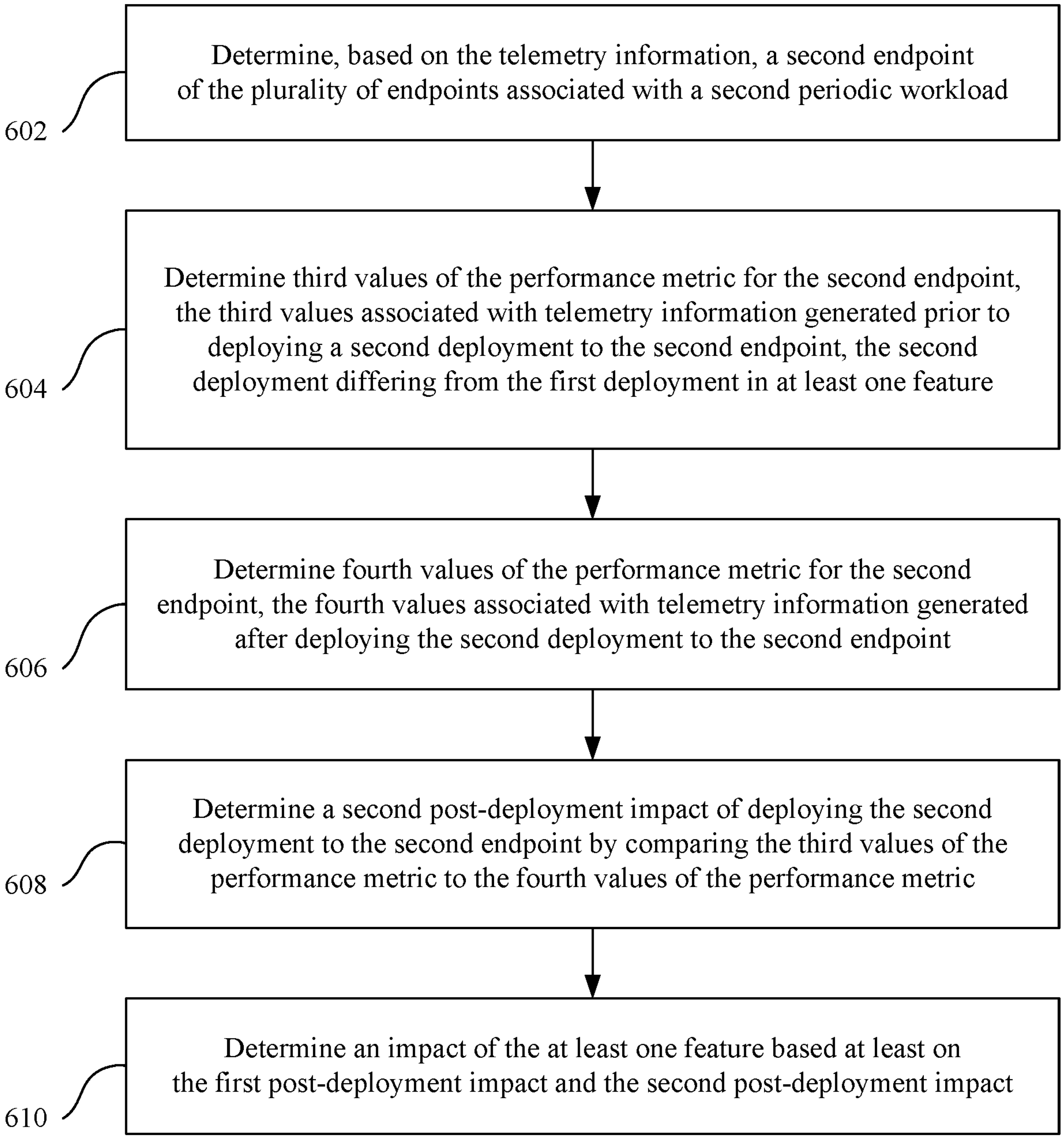
FIG. 6 depicts a flowchart of a process for determining an impact of a feature of a deployment, in accordance with an embodiment.

Embodiments described herein may operate in various ways to determine an impact of a feature of a deployment. For instance, FIG. 6 depicts a flowchart 600 of a process for determining an impact of a feature of a deployment, in accordance with an embodiment. Server infrastructure 104, flighting services 108, impact determiner 116, telemetry data analyzer 202, performance metric determiner 204, and/or metric comparator 206 of FIGS. 1 and 2 may operate according to flowchart 600, for example. Note that not all steps of flowchart 600 may need to be performed in all embodiments, and in some embodiments, the steps of flowchart 600 may be performed in different orders than shown. Flowchart 600 is described as follows with respect to FIGS. 1 and 2 for illustrative purposes.

Flowchart 600 starts at step 602. In step 602, a second endpoint of the plurality of endpoints associated with a second periodic workload is determined based on the telemetry information. For example, telemetry data analyzer 202 may determine a second resource endpoint associated with a second periodic workload. As discussed above, a periodic workload may include, but is not limited to, queries or requests of similar or identical complexities that repeat at a threshold periodicity, and that process data satisfying a similarity threshold. In embodiments, telemetry data analyzer 202 may analyze telemetry data 122 to identify queries that are associated with the same or identical query hash value, that are associated with query timestamps that satisfy a relationship with a periodicity threshold (e.g., period of one day), and that operate on data that satisfy a similarity threshold.

In step 604, third values of a performance metric are determined for the second endpoint, the third values associated with telemetry information generated prior to deploying a second deployment to the second endpoint, the second deployment differing from the first deployment in at least one feature. For example, performance metric determiner 204 may determine pre-deployment performance metric values associated with the second resource endpoint. As discussed above, pre-deployment performance metric values may be determined based on telemetry data generated prior to, and/or associated with timestamps occurring prior to, the deployment of a change. In embodiments, performance metric determiner 204 may provide the pre-deployment performance metric values to metric comparator 206 as part of performance metric values 220.

In step 606, fourth values of a performance metric are determined for the second endpoint, the fourth values associated with telemetry information generated after deploying a second deployment to the second endpoint. For example, performance metric determiner 204 may determine post-deployment performance metric values associated with the second resource endpoint. As discussed above, post-deployment performance metric values may be determined based on telemetry data generated after, and/or associated with timestamps occurring after, the deployment of a change. In embodiments, performance metric determiner 204 may provide the post-deployment performance metric values to metric comparator 206 as part of performance metric values 220.

In step 608, a second post-deployment impact of deploying the second deployment to the second resource endpoint is determined by comparing the third values of the performance metric to the fourth values of the performance metric. For example, metric comparator 206 may determine the impact of deploying the change to the second resource endpoint by comparing the pre-deployment performance metric values and the post-deployment performance metric values associated with the second resource endpoint.

In step 610, an impact of the at least one feature by deploying the first deployment to the plurality of endpoints is determined based at least on the first post-deployment impact and the second post-deployment impact. For example, metric comparator 206 may determine the impact of a particular feature of a deployment that bundles a plurality of features by comparing the post-deployment impacts of deployments that differ only in the particular feature. For instance, if the deployment on resource endpoint 110A differs from the deployment on resource endpoint 110B in only one features, the impact of the one feature may be determined by comparing the post-deployment impact associated with resource endpoint 110A and the post-deployment impact associated with resource endpoint 110B. Such A/B testing allows metric comparator 206 to isolate features of a deployment to determine the impact of any particular feature.

III. Example Mobile Device and Computer System Implementation

The systems and methods described above in reference to FIGS. 1-6, including computing device(s) 102A-102N, server infrastructure 104, network 106, management service 108, resource endpoint(s) 110A-110N, telemetry data transformer 112, telemetry data warehouse 114, impact determiner 116, telemetry data analyzer 202, performance metric determiner 204, metric comparator 206, UI manager 208, deployment manager 210, frontend resources 212, backend resources 214, workload processor 216, and/or each of the components described therein, and the steps of flowcharts 300, 400, 500, and/or 600 may be implemented in hardware, or hardware combined with one or both of software and/or firmware. For example, computing device(s) 102A-102N, server infrastructure 104, network 106, management service 108, resource endpoint(s) 110A-110N, telemetry data transformer 112, telemetry data warehouse 114, impact determiner 116, telemetry data analyzer 202, performance metric determiner 204, metric comparator 206, UI manager 208, deployment manager 210, frontend resources 212, backend resources 214, workload processor 216, and/or each of the components described therein, and the steps of flowcharts 300, 400, 500, and/or 600 may be each implemented as computer program code/instructions configured to be executed in one or more processors and stored in a computer readable storage medium. Alternatively, computing device (s) 102A-102N, server infrastructure 104, network 106, management service 108, resource endpoint(s) 110A-110N, telemetry data transformer 112, telemetry data warehouse 114, impact determiner 116, telemetry data analyzer 202, performance metric determiner 204, metric comparator 206, UI manager 208, deployment manager 210, frontend resources 212, backend resources 214, workload processor 216, and/or each of the components described therein, and the steps of flowcharts 300, 400, 500, and/or 600 may be each implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 7:
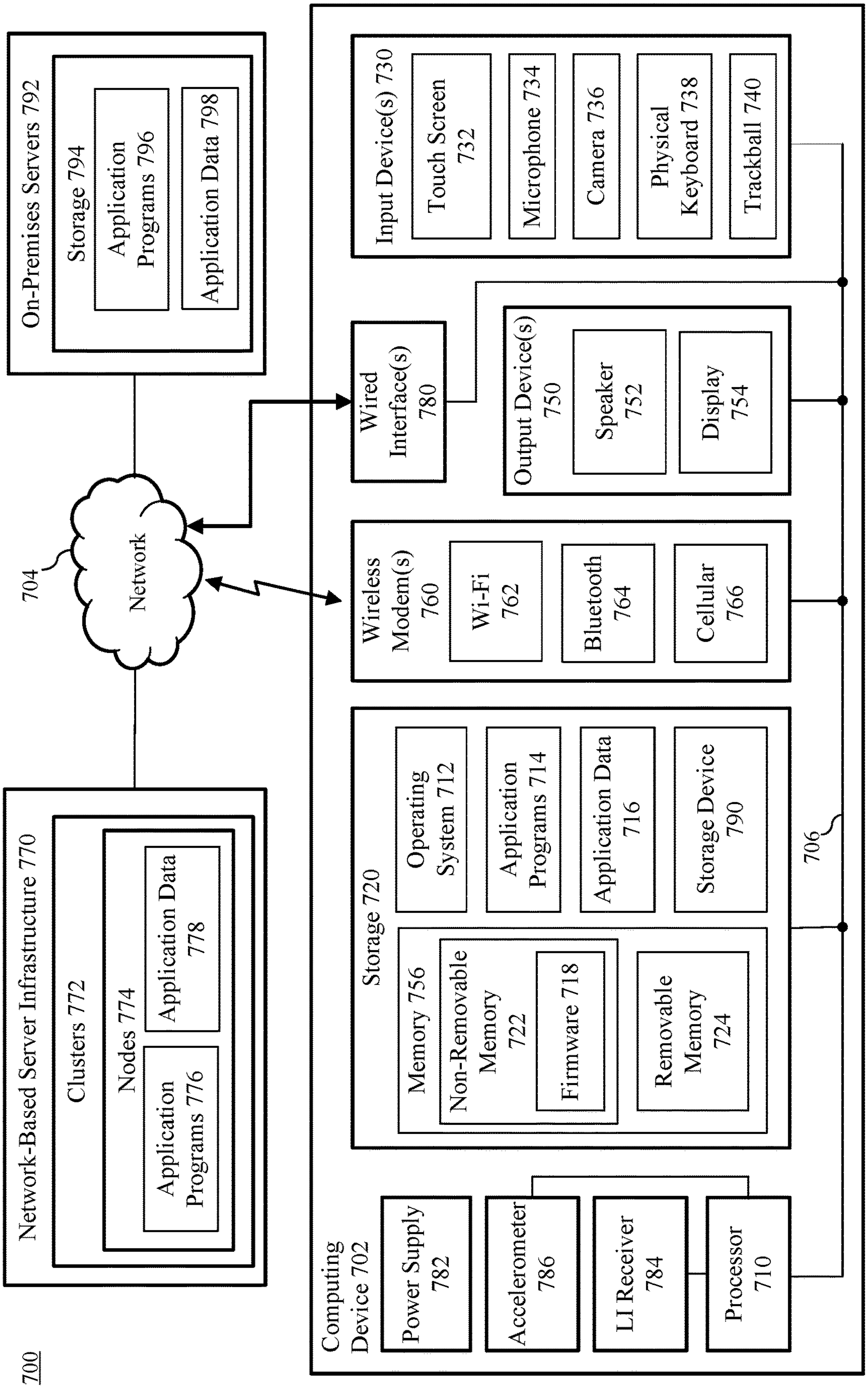
FIG. 7 shows a block diagram of an example computer system in which embodiments may be implemented.

Embodiments disclosed herein may be implemented in one or more computing devices that may be mobile (a mobile device) and/or stationary (a stationary device) and may include any combination of the features of such mobile and stationary computing devices. Examples of computing devices in which embodiments may be implemented are described as follows with respect to FIG. 7. FIG. 7 shows a block diagram of an exemplary computing environment 700 that includes a computing device 702. In some embodiments, computing device 702 is communicatively coupled with devices (not shown in FIG. 7) external to computing environment 700 via network 704. Network 704 comprises one or more networks such as local area networks (LANs), wide area networks (WANs), enterprise networks, the Internet, etc., and may include one or more wired and/or wireless portions. Network 704 may additionally or alternatively include a cellular network for cellular communications. Computing device 702 is described in detail as follows.

Computing device 702 can be any of a variety of types of computing devices. For example, computing device 702 may be a mobile computing device such as a handheld computer (e.g., a personal digital assistant (PDA)), a laptop computer, a tablet computer (such as an Apple iPad™), a hybrid device, a notebook computer (e.g., a Google Chromebook™ by Google LLC), a netbook, a mobile phone (e.g., a cell phone, a smart phone such as an Apple® iPhone® by Apple Inc., a phone implementing the Google® Android™ operating system, etc.), a wearable computing device (e.g., a head-mounted augmented reality and/or virtual reality device including smart glasses such as Google® Glass™, Oculus Quest 2® by Reality Labs, a division of Meta Platforms, Inc, etc.), or other type of mobile computing device. Computing device 702 may alternatively be a stationary computing device such as a desktop computer, a personal computer (PC), a stationary server device, a minicomputer, a mainframe, a supercomputer, etc.

As shown in FIG. 7, computing device 702 includes a variety of hardware and software components, including a processor 710, a storage 720, one or more input devices 730, one or more output devices 750, one or more wireless modems 760, one or more wired interfaces 780, a power supply 782, a location information (LI) receiver 784, and an accelerometer 786. Storage 720 includes memory 756, which includes non-removable memory 722 and removable memory 724, and a storage device 790. Storage 720 also stores an operating system 712, application programs 714, and application data 716. Wireless modem(s) 760 include a Wi-Fi modem 762, a Bluetooth modem 764, and a cellular modem 766. Output device(s) 750 includes a speaker 752 and a display 754. Input device(s) 730 includes a touch screen 732, a microphone 734, a camera 736, a physical keyboard 738, and a trackball 740. Not all components of computing device 702 shown in FIG. 7 are present in all embodiments, additional components not shown may be present, and any combination of the components may be present in a particular embodiment. These components of computing device 702 are described as follows.

A single processor 710 (e.g., central processing unit (CPU), microcontroller, a microprocessor, signal processor, ASIC (application specific integrated circuit), and/or other physical hardware processor circuit) or multiple processors 710 may be present in computing device 702 for performing such tasks as program execution, signal coding, data processing, input/output processing, power control, and/or other functions. Processor 710 may be a single-core or multi-core processor, and each processor core may be single-threaded or multithreaded (to provide multiple threads of execution concurrently). Processor 710 is configured to execute program code stored in a computer readable medium, such as program code of operating system 712 and application programs 714 stored in storage 720. Operating system 712 controls the allocation and usage of the components of computing device 702 and provides support for one or more application programs 714 (also referred to as "applications" or "apps"). Application programs 714 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Any component in computing device 702 can communicate with any other component according to function, although not all connections are shown for ease of illustration. For instance, as shown in FIG. 7, bus 706 is a multiple signal line communication medium (e.g., conductive traces in silicon, metal traces along a motherboard, wires, etc.) that may be present to communicatively couple processor 710 to various other components of computing device 702, although in other embodiments, an alternative bus, further buses, and/or one or more individual signal lines may be present to communicatively couple components. Bus 706 represents one or more of any of several types of bus structures, including a memory bus or memory controller, a peripheral bus, an accelerated graphics port, and a processor or local bus using any of a variety of bus architectures.

Storage 720 is physical storage that includes one or both of memory 756 and storage device 790, which store operating system 712, application programs 714, and application data 716 according to any distribution. Non-removable memory 722 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 722 may include main memory and may be separate from or fabricated in a same integrated circuit as processor 710. As shown in FIG. 7, non-removable memory 722 stores firmware 718, which may be present to provide low-level control of hardware. Examples of firmware 718 include BIOS (Basic Input/Output System, such as on personal computers) and boot firmware (e.g., on smart phones). Removable memory 724 may be inserted into a receptacle of or otherwise coupled to computing device 702 and can be removed by a user from computing device 702. Removable memory 724 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 790 may be present that are internal and/or external to a housing of computing device 702 and may or may not be removable. Examples of storage device 790 include a hard disk drive, a SSD, a thumb drive (e.g., a USB (Universal Serial Bus) flash drive), or other physical storage device.

One or more programs may be stored in storage 720. Such programs include operating system 712, one or more application programs 714, and other program modules and program data. Examples of such application programs may include, for example, computer program logic (e.g., computer program code/instructions) for implementing one or more of computing device(s) 102A-102N, server infrastructure 104, network 106, management service 108, resource endpoint(s) 110A-110N, telemetry data transformer 112, telemetry data warehouse 114, impact determiner 116, telemetry data analyzer 202, performance metric determiner 204, metric comparator 206, UI manager 208, deployment manager 210, frontend resources 212, backend resources 214, workload processor 216, and/or each of the components thereof, as well as the flowcharts/flow diagrams (e.g., flowcharts 300, 400, 500 and/or 600) described herein, including portions thereof, and/or further examples described herein.

Storage 720 also stores data used and/or generated by operating system 712 and application programs 714 as application data 716. Examples of application data 716 include web pages, text, images, tables, sound files, video data, and other data, which may also be sent to and/or received from one or more network servers or other devices via one or more wired or wireless networks. Storage 720 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 702 through one or more input devices 730 and may receive information from computing device 702 through one or more output devices 750. Input device(s) 730 may include one or more of touch screen 732, microphone 734, camera 736, physical keyboard 738 and/or trackball 740 and output device(s) 750 may include one or more of speaker 752 and display 754. Each of input device(s) 730 and output device(s) 750 may be integral to computing device 702 (e.g., built into a housing of computing device 702) or external to computing device 702 (e.g., communicatively coupled wired or wirelessly to computing device 702 via wired interface(s) 780 and/or wireless modem(s) 760). Further input devices 730 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 754 may display information, as well as operating as touch screen 732 by receiving user commands and/or other information (e.g., by touch, finger gestures, virtual keyboard, etc.) as a user interface. Any number of each type of input device(s) 730 and output device(s) 750 may be present, including multiple microphones 734, multiple cameras 736, multiple speakers 752, and/or multiple displays 754.

One or more wireless modems 760 can be coupled to antenna(s) (not shown) of computing device 702 and can support two-way communications between processor 710 and devices external to computing device 702 through network 704, as would be understood to persons skilled in the relevant art(s). Wireless modem 760 is shown generically and can include a cellular modem 766 for communicating with one or more cellular networks, such as a GSM network for data and voice communications within a single cellular network, between cellular networks, or between the mobile device and a public switched telephone network (PSTN). Wireless modem 760 may also or alternatively include other radio-based modem types, such as a Bluetooth modem 764 (also referred to as a "Bluetooth device") and/or Wi-Fi 762 modem (also referred to as an "wireless adaptor"). Wi-Fi modem 762 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 764 is configured to communicate with another Bluetooth-capable device according to the Bluetooth short-range wireless technology standard(s) such as IEEE 802.15.1 and/or managed by the Bluetooth Special Interest Group (SIG).

Computing device 702 can further include power supply 782, LI receiver 784, accelerometer 786, and/or one or more wired interfaces 780. Example wired interfaces 780 include a USB port, IEEE 1394 (Fire Wire) port, a RS-232 port, an HDMI (High-Definition Multimedia Interface) port (e.g., for connection to an external display), a DisplayPort port (e.g., for connection to an external display), an audio port, an Ethernet port, and/or an Apple® Lightning® port, the purposes and functions of each of which are well known to persons skilled in the relevant art(s). Wired interface(s) 780 of computing device 702 provide for wired connections between computing device 702 and network 704, or between computing device 702 and one or more devices/peripherals when such devices/peripherals are external to computing device 702 (e.g., a pointing device, display 754, speaker 752, camera 736, physical keyboard 738, etc.). Power supply 782 is configured to supply power to each of the components of computing device 702 and may receive power from a battery internal to computing device 702, and/or from a power cord plugged into a power port of computing device 702 (e.g., a USB port, an A/C power port). LI receiver 784 may be used for location determination of computing device 702 and may include a satellite navigation receiver such as a Global Positioning System (GPS) receiver or may include other type of location determiner configured to determine location of computing device 702 based on received information (e.g., using cell tower triangulation, etc.). Accelerometer 786 may be present to determine an orientation of computing device 702.

Note that the illustrated components of computing device 702 are not required or all-inclusive, and fewer or greater numbers of components may be present as would be recognized by one skilled in the art. For example, computing device 702 may also include one or more of a gyroscope, barometer, proximity sensor, ambient light sensor, digital compass, etc. Processor 710 and memory 756 may be co-located in a same semiconductor device package, such as being included together in an integrated circuit chip, FPGA, or system-on-chip (SOC), optionally along with further components of computing device 702.

In embodiments, computing device 702 is configured to implement any of the above-described features of flowcharts herein. Computer program logic for performing any of the operations, steps, and/or functions described herein may be stored in storage 720 and executed by processor 710.

In some embodiments, server infrastructure 770 may be present in computing environment 700 and may be communicatively coupled with computing device 702 via network 704. Server infrastructure 770, when present, may be a network-accessible server set (e.g., a cloud-based environment or platform). As shown in FIG. 7, server infrastructure 770 includes clusters 772. Each of clusters 772 may comprise a group of one or more compute nodes and/or a group of one or more storage nodes. For example, as shown in FIG. 7, cluster 772 includes nodes 774. Each of nodes 774 are accessible via network 704 (e.g., in a "cloud-based" embodiment) to build, deploy, and manage applications and services. Any of nodes 774 may be a storage node that comprises a plurality of physical storage disks, SSDs, and/or other physical storage devices that are accessible via network 704 and are configured to store data associated with the applications and services managed by nodes 774. For example, as shown in FIG. 7, nodes 774 may store application data 778.

Each of nodes 774 may, as a compute node, comprise one or more server computers, server systems, and/or computing devices. For instance, a node 774 may include one or more of the components of computing device 702 disclosed herein. Each of nodes 774 may be configured to execute one or more software applications (or "applications") and/or services and/or manage hardware resources (e.g., processors, memory, etc.), which may be utilized by users (e.g., customers) of the network-accessible server set. For example, as shown in FIG. 7, nodes 774 may operate application programs 776. In an implementation, a node of nodes 774 may operate or comprise one or more virtual machines, with each virtual machine emulating a system architecture (e.g., an operating system), in an isolated manner, upon which applications such as application programs 776 may be executed.

In an embodiment, one or more of clusters 772 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 772 may be a datacenter in a distributed collection of datacenters. In embodiments, exemplary computing environment 700 comprises part of a cloud-based platform such as Amazon Web Services® of Amazon Web Services, Inc. or Google Cloud Platform™ of Google LLC, although these are only examples and are not intended to be limiting.

In an embodiment, computing device 702 may access application programs 776 for execution in any manner, such as by a client application and/or a browser at computing device 702. Example browsers include Microsoft Edge® by Microsoft Corp. of Redmond, Washington, Mozilla Firefox®, by Mozilla Corp. of Mountain View, California, Safari®, by Apple Inc. of Cupertino, California, and Google® Chrome by Google LLC of Mountain View, California.

For purposes of network (e.g., cloud) backup and data security, computing device 702 may additionally and/or alternatively synchronize copies of application programs 714 and/or application data 716 to be stored at network-based server infrastructure 770 as application programs 776 and/or application data 778. For instance, operating system 712 and/or application programs 714 may include a file hosting service client, such as Microsoft® OneDrive® by Microsoft Corporation, Amazon Simple Storage Service (Amazon S3)® by Amazon Web Services, Inc., Dropbox® by Dropbox, Inc., Google Drive™ by Google LLC, etc., configured to synchronize applications and/or data stored in storage 720 at network-based server infrastructure 770.

In some embodiments, on-premises servers 792 may be present in computing environment 700 and may be communicatively coupled with computing device 702 via network 704. On-premises servers 792, when present, are hosted within an organization's infrastructure and, in many cases, physically onsite of a facility of that organization. On-premises servers 792 are controlled, administered, and maintained by IT (Information Technology) personnel of the organization or an IT partner to the organization. Application data 798 may be shared by on-premises servers 792 between computing devices of the organization, including computing device 702 (when part of an organization) through a local network of the organization, and/or through further networks accessible to the organization (including the Internet). Furthermore, on-premises servers 792 may serve applications such as application programs 796 to the computing devices of the organization, including computing device 702. Accordingly, on-premises servers 792 may include storage 794 (which includes one or more physical storage devices such as storage disks and/or SSDs) for storage of application programs 796 and application data 798 and may include one or more processors for execution of application programs 796. Still further, computing device 702 may be configured to synchronize copies of application programs 714 and/or application data 716 for backup storage at on-premises servers 792 as application programs 796 and/or application data 798.

Embodiments described herein may be implemented in one or more of computing device 702, network-based server infrastructure 770, and on-premises servers 792. For example, in some embodiments, computing device 702 may be used to implement systems, clients, or devices, or components/subcomponents thereof, disclosed elsewhere herein. In other embodiments, a combination of computing device 702, network-based server infrastructure 770, and/or on-premises servers 792 may be used to implement the systems, clients, or devices, or components/subcomponents thereof, disclosed elsewhere herein.

As used herein, the terms "computer program medium," "computer-readable medium," and "computer-readable storage medium," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 720. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 714) may be stored in storage 720. Such computer programs may also be received via wired interface(s) 780 and/or wireless modem(s) 760 over network 704. Such computer programs, when executed or loaded by an application, enable computing device 702 to implement features of embodiments discussed herein. Accordingly, such computer programs represent controllers of the computing device 702.

Embodiments are also directed to computer program products comprising computer code or instructions stored on any computer-readable medium or computer-readable storage medium. Such computer program products include the physical storage of storage 720 as well as further physical storage types.

IV. Additional Example Embodiments

In an embodiment, a method includes: analyzing telemetry information associated with workloads executing on a plurality of endpoints; determining, based on the telemetry information, a first endpoint of the plurality of endpoints associated with a first periodic workload; determining first values of a performance metric for the first endpoint, the first values associated with telemetry information generated prior to deploying a first deployment to the first endpoint; determining second values of the performance metric for the first endpoint, the second values associated with telemetry information generated after deploying the first deployment to the first endpoint; determining a first post-deployment impact of deploying the first deployment to the first endpoint by comparing the first values of the performance metric to the second values of the performance metric; and performing a first action based at least on the first post-deployment impact.

In an embodiment, determining, based on the telemetry information, a first endpoint of the plurality of endpoints associated with a first periodic workload comprises: determining, based on the telemetry information, a plurality of query hashes associated with the first endpoint; determining that a first query hash of the plurality of query hashes repeats on a periodic basis with a periodicity that satisfies a predetermined relationship with a periodicity threshold; determining a variation in query data associated with queries associated with the first query hash; and determining that the variation in query data satisfies a predetermined relationship with a data variation threshold.

In an embodiment, the method further includes: determining, based on the telemetry information, a second endpoint of the plurality of endpoints associated with a second periodic workload; determining third values of the performance metric for the second endpoint, the third values associated with telemetry information generated prior to deploying the first deployment to the second endpoint; determining fourth values of the performance metric for the second endpoint, the fourth values associated with telemetry information generated after deploying the first deployment to the second endpoint; determining a second post-deployment impact of deploying the first deployment to the second endpoint by comparing the third values of the performance metric to the fourth values of the performance metric; and determining an overall impact of deploying the first deployment to the plurality of endpoints based at least on the first post-deployment impact and the second post-deployment impact.

In an embodiment, the method further includes: determining, based on the telemetry information, a second endpoint of the plurality of endpoints associated with a second periodic workload; determining third values of the performance metric for the second endpoint, the third values associated with telemetry information generated prior to deploying a second deployment to the second endpoint, the second deployment differing from the first deployment in at least one feature; determining fourth values of the performance metric for the second endpoint, the fourth values associated with telemetry information generated after deploying the second deployment to the second endpoint; determining a second post-deployment impact of deploying the second deployment to the second endpoint by comparing the third values of the performance metric to the fourth values of the performance metric; and determining an impact of the at least one feature based at least on the first post-deployment impact and the second post-deployment impact.

In an embodiment, the performance metric comprises at least one of: a query duration; a query success rate; a login success rate; a memory utilization of frontend applications associated with the first endpoint; a memory utilization of backend applications associated with the first endpoint; a processor utilization of frontend applications associated with the first endpoint; or a processor utilization of backend applications associated with the first endpoint.

In an embodiment, the first action comprises at least one of: undeploying the first deployment from the first endpoint; modifying the first deployment based at least on the first post-deployment impact; deploying the first deployment to additional endpoints of the plurality of endpoints; or generating a user interface element based at least on the first post-deployment impact.

In an embodiment, the first periodic workload comprises a serverless structured query language (SQL) workload.

In an embodiment, a system includes: a processor; and a memory device stores program code structured to cause the processor to: analyze telemetry information associated with workloads executing on a plurality of endpoints; determine, based on the telemetry information, a first endpoint of the plurality of endpoints associated with a first periodic workload; determine first values of a performance metric for the first endpoint, the first values associated with telemetry information generated prior to deploying a first deployment to the first endpoint; determine second values of the performance metric for the first endpoint, the second values associated with telemetry information generated after deploying the first deployment to the first endpoint; determine a first post-deployment impact of deploying the first deployment to the first endpoint by comparing the first values of the performance metric to the second values of the performance metric; and perform a first action based at least on the first post-deployment impact.

In an embodiment, to determine a first endpoint of the plurality of endpoints associated with a first periodic workload, the program code is further structured to cause the processor to: determine, based on the telemetry information, a plurality of query hashes associated with the first endpoint; determine that a first query hash of the plurality of query hashes repeats on a periodic basis with a periodicity that satisfies a predetermined relationship with a periodicity threshold; determine a variation in query data associated with queries associated with the first query hash; and determine that the variation in query data satisfies a predetermined relationship with a data variation threshold.

In an embodiment, the program code is further structured to cause the processor to: determine, based on the telemetry information, a second endpoint of the plurality of endpoints associated with a second periodic workload; determine third values of the performance metric for the second endpoint, the third values associated with telemetry information generated prior to deploying the first deployment to the second endpoint; determine fourth values of the performance metric for the second endpoint, the fourth values associated with telemetry information generated after deploying the first deployment to the second endpoint; determine a second post-deployment impact of deploying the first deployment to the second endpoint by comparing the third values of the performance metric to the fourth values of the performance metric; and determine an overall impact of deploying the first deployment to the plurality of endpoints based at least on the first post-deployment impact and the second post-deployment impact.

In an embodiment, the program code is further structured to cause the processor to: determine, based on the telemetry information, a second endpoint of the plurality of endpoints associated with a second periodic workload; determine third values of the performance metric for the second endpoint, the third values associated with telemetry information generated prior to deploying a second deployment to the second endpoint, the second deployment differing from the first deployment in at least one feature; determine fourth values of the performance metric for the second endpoint, the fourth values associated with telemetry information generated after deploying the second deployment to the second endpoint; determine a second post-deployment impact of deploying the second deployment to the second endpoint by comparing the third values of the performance metric to the fourth values of the performance metric; and determine a an impact of the at least one feature based at least on the first post-deployment impact and the second post-deployment impact.

In an embodiment, the performance metric comprises at least one of: a query duration; a query success rate; a login success rate; a memory utilization of frontend applications associated with the first endpoint; a memory utilization of backend applications associated with the first endpoint; a processor utilization of frontend applications associated with the first endpoint; or a processor utilization of backend applications associated with the first endpoint.

In an embodiment, the first action comprises at least one of: undeploying the first deployment from the first endpoint; modifying the first deployment based at least on the first post-deployment impact; deploying the first deployment to additional endpoints of the plurality of endpoints; or generating a user interface element based at least on the first post-deployment impact.

In an embodiment, the first endpoint comprises at least one of: a service endpoint; or a private endpoint.

In an embodiment, a computer-readable storage medium comprising computer-executable instructions that, when executed by a processor, cause the processor to: analyze telemetry information associated with workloads executing on a plurality of endpoints; determine, based on the telemetry information, a first endpoint of the plurality of endpoints associated with a first periodic workload; determine first values of a performance metric for the first endpoint, the first values associated with telemetry information generated prior to deploying a first deployment to the first endpoint; determine second values of the performance metric for the first endpoint, the second values associated with telemetry information generated after deploying the first deployment to the first endpoint; determine a first post-deployment impact of deploying the first deployment to the first endpoint by comparing the first values of the performance metric to the second values of the performance metric; and perform a first action based at least on the first post-deployment impact.

In an embodiment, to determine a first endpoint of the plurality of endpoints associated with a first periodic workload, the computer-executable instructions, when executed by the processor, further cause the processor to: determine, based on the telemetry information, a plurality of query hashes associated with the first endpoint; determine that a first query hash of the plurality of query hashes repeats on a periodic basis with a periodicity that satisfies a predetermined relationship with a periodicity threshold; determine a variation in query data associated with queries associated with the first query hash; and determine that the variation in query data satisfies a predetermined relationship with a data variation threshold.

In an embodiment, the computer-executable instructions, when executed by the processor, further cause the processor to: determine, based on the telemetry information, a second endpoint of the plurality of endpoints associated with a second periodic workload; determine third values of the performance metric for the second endpoint, the third values associated with telemetry information generated prior to deploying the first deployment to the second endpoint; determine fourth values of the performance metric for the second endpoint, the fourth values associated with telemetry information generated after deploying the first deployment to the second endpoint; determine a second post-deployment impact of deploying the first deployment to the second endpoint by comparing the third values of the performance metric to the fourth values of the performance metric; and determine an overall impact of deploying the first deployment to the plurality of endpoints based at least on the first post-deployment impact and the second post-deployment impact.

In an embodiment, the computer-executable instructions, when executed by the processor, further cause the processor to: determine, based on the telemetry information, a second endpoint of the plurality of endpoints associated with a second periodic workload; determine third values of the performance metric for the second endpoint, the third values associated with telemetry information generated prior to deploying a second deployment to the second endpoint, the second deployment differing from the first deployment in at least one feature; determine fourth values of the performance metric fort the second endpoint, the fourth values associated with telemetry information generated after deploying the second deployment to the second endpoint; determine a second post-deployment impact of deploying the second deployment to the second endpoint by comparing the third values of the performance metric to the fourth values of the performance metric; and determine an impact of the at least one feature based at least on the first post-deployment impact and the second post-deployment impact.

In an embodiment, the performance metric comprises at least one of: a query duration; a query success rate; a login success rate; a memory utilization of frontend applications associated with the first endpoint; a memory utilization of backend applications associated with the first endpoint; a processor utilization of frontend applications associated with the first endpoint; or a processor utilization of backend applications associated with the first endpoint.

In an embodiment, the first action comprises at least one of: undeploying the first deployment from the first endpoint; modifying the first deployment based at least on the first post-deployment impact; deploying the first deployment to additional endpoints of the plurality of endpoints; or generating a user interface element based at least on the first post-deployment impact.

V. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Furthermore, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

While various embodiments of the present disclosure have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed:

1. A method comprising:

analyzing telemetry information associated with workloads executing on a plurality of endpoints in a distributed computing system;

determining, based on the telemetry information, a first endpoint of the plurality of endpoints associated with a first periodic workload, wherein the first periodic workload is identified based on both determining that a query hash associated with the first endpoint repeats on a periodic basis satisfying a periodicity threshold and determining that a variation in query data associated with queries associated with the query hash satisfies a data variation threshold;

determining first values of a performance metric corresponding to execution of the first periodic workload for the first endpoint, the first values associated with telemetry information generated prior to deploying a first deployment to the first endpoint;

determining second values of the performance metric for the first endpoint, the second values corresponding to execution of the first periodic workload for the first endpoint and associated with telemetry information generated after deploying the first deployment to the first endpoint;

determining a first post-deployment impact of deploying the first deployment to the first endpoint by comparing the first values of the performance metric to the second values of the performance metric; and performing a first action based at least on the first post-deployment impact, wherein the first action comprises automatically modifying deployment of the first deployment to the plurality of endpoints based on the first post-deployment impact to control operation of the distributed computing system.

2. The method of claim 1, further comprising:

determining, based on the telemetry information associated with the workloads executing on the plurality of endpoints, a second endpoint of the plurality of endpoints associated with a second periodic workload;

determining third values of the performance metric for the second endpoint, the third values associated with pre-deployment telemetry information generated prior to deploying the first deployment to the second endpoint;

determining fourth values of the performance metric for the second endpoint, the fourth values associated with post-deployment telemetry information generated after deploying the first deployment to the second endpoint;

determining a second post-deployment impact of deploying the first deployment to the second endpoint by comparing the third values of the performance metric to the fourth values of the performance metric; and determining an overall impact of deploying the first deployment to the plurality of endpoints based at least on the first post-deployment impact and the second post-deployment impact.

3. The method of claim 1, further comprising:

determining, based on the telemetry information associated with the workloads executing on the plurality of endpoints, a second endpoint of the plurality of endpoints associated with a second periodic workload;

determining third values of the performance metric for the second endpoint, the third values associated with pre-deployment telemetry information generated prior to deploying a second deployment to the second endpoint, the second deployment differing from the first deployment in at least one feature;

determining fourth values of the performance metric for the second endpoint, the fourth values associated with post-deployment telemetry information generated after deploying the second deployment to the second endpoint;

determining a second post-deployment impact of deploying the second deployment to the second endpoint by comparing the third values of the performance metric to the fourth values of the performance metric; and determining an impact of the at least one feature based at least on the first post-deployment impact and the second post-deployment impact.

4. The method of claim 1, wherein the performance metric comprises at least one of:

a query duration;

a query success rate;

a login success rate;

a memory utilization of frontend applications associated with the first endpoint;

a memory utilization of backend applications associated with the first endpoint;

a processor utilization of the frontend applications associated with the first endpoint; or a processor utilization of the backend applications associated with the first endpoint.

5. The method of claim 1, wherein the first action comprises at least one of:

undeploying the first deployment from the first endpoint;

modifying the first deployment based at least on the first post-deployment impact;

deploying the first deployment to additional endpoints of the plurality of endpoints; or generating a user interface element based at least on the first post-deployment impact.

6. The method of claim 1, wherein the first periodic workload comprises a workload associated with a serverless structured query language (SQL) pool.

7. A system, comprising: a processor; and a memory device stores program code structured to cause the processor to:

analyze telemetry information associated with workloads executing on a plurality of endpoints in a distributed computing system;

determine, based on the telemetry information, a first endpoint of the plurality of endpoints associated with a first periodic workload, wherein the first periodic workload is identified based on both determining that a query hash associated with the first endpoint repeats on a periodic basis satisfying a periodicity threshold and determining that a variation in query data associated with queries associated with the query hash satisfies a data variation threshold;

determine first values of a performance metric corresponding to execution of the first periodic workload for the first endpoint, the first values associated with telemetry information generated prior to deploying a first deployment to the first endpoint;

determine second values of the performance metric for the first endpoint, the second values corresponding to execution of the first periodic workload for the first endpoint and associated with telemetry information generated after deploying the first deployment to the first endpoint;

determine a first post-deployment impact of deploying the first deployment to the first endpoint by comparing the first values of the performance metric to the second values of the performance metric; and perform a first action based at least on the first post-deployment impact, wherein the first action comprises automatically modifying deployment of the first deployment to the plurality of endpoints based on the first post-deployment impact to control operation of the distributed computing system.

8. The system of claim 7, wherein the program code is further structured to cause the processor to:

determine, based on the telemetry information associated with the workloads executing on the plurality of endpoints, a second endpoint of the plurality of endpoints associated with a second periodic workload;

determine third values of the performance metric for the second endpoint, the third values associated with post-deployment telemetry information generated prior to deploying the first deployment to the second endpoint;

determine fourth values of the performance metric for the second endpoint, the fourth values associated with pre-deployment telemetry information generated after deploying the first deployment to the second endpoint;

determine a second post-deployment impact of deploying the first deployment to the second endpoint by comparing the third values of the performance metric to the fourth values of the performance metric; and determine an overall impact of deploying the first deployment to the plurality of endpoints based at least on the first post-deployment impact and the second post-deployment impact.

9. The system of claim 7, wherein the program code is further structured to cause the processor to:

determine, based on the telemetry information associated with the workloads executing on the plurality of endpoints, a second endpoint of the plurality of endpoints associated with a second periodic workload;

determine third values of the performance metric for the second endpoint, the third values associated with pre-deployment telemetry information generated prior to deploying a second deployment to the second endpoint, the second deployment differing from the first deployment in at least one feature;

determine fourth values of the performance metric for the second endpoint, the fourth values associated with post-deployment telemetry information generated after deploying the second deployment to the second endpoint;

determine a second post-deployment impact of deploying the second deployment to the second endpoint by comparing the third values of the performance metric to the fourth values of the performance metric; and determine an impact of the at least one feature based at least on the first post-deployment impact and the second post-deployment impact.

10. The system of claim 7, wherein the performance metric comprises at least one of:

a query duration;

a query success rate;

a login success rate;

a memory utilization of frontend applications associated with the first endpoint;

a memory utilization of backend applications associated with the first endpoint;

a processor utilization of the frontend applications associated with the first endpoint; or a processor utilization of the backend applications associated with the first endpoint.

11. The system of claim 7, wherein the first action comprises at least one of:

undeploying the first deployment from the first endpoint;

modifying the first deployment based at least on the first post-deployment impact;

deploying the first deployment to additional endpoints of the plurality of endpoints; or generating a user interface element based at least on the first post-deployment impact.

12. The system of claim 7, wherein the first endpoint comprises at least one of:

a service endpoint; or a private endpoint.

13. A computer-readable storage medium comprising computer-executable instructions that, when executed by a processor, cause the processor to:

analyze telemetry information associated with workloads executing on a plurality of endpoints in a distributed computing system;

determine, based on the telemetry information, a first endpoint of the plurality of endpoints associated with a first periodic workload, wherein the first periodic workload is identified based on both determining that a query hash associated with the first repeats on a periodic basis satisfying a periodicity threshold and determining that a variation in query data associated with queries associated with the query hash satisfies a data variation threshold;

determine first values of a performance metric corresponding to execution of the first periodic workload for the first endpoint, the first values associated with telemetry information generated prior to deploying a first deployment to the first endpoint;

determine second values of the performance metric for the first endpoint, the second values corresponding to execution of the first periodic workload for the first endpoint and associated with telemetry information generated after deploying the first deployment to the first endpoint;

determine a first post-deployment impact of deploying the first deployment to the first endpoint by comparing the first values of the performance metric to the second values of the performance metric; and perform a first action based at least on the first post-deployment impact, wherein the first action comprises automatically modifying deployment of the first deployment to the plurality of endpoints based on the first post-deployment impact to control operation of the distributed computing system.

14. The computer-readable storage medium of claim 13, wherein the computer-executable instructions, when executed by the processor, further cause the processor to:

determine, based on the telemetry information associated with the workloads executing on the plurality of endpoints, a second endpoint of the plurality of endpoints associated with a second periodic workload;

determine third values of the performance metric for the second endpoint, the third values associated with pre-deployment telemetry information generated prior to deploying the first deployment to the second endpoint;

determine fourth values of the performance metric for the second endpoint, the fourth values associated with post-deployment telemetry information generated after deploying the first deployment to the second endpoint;

determine a second post-deployment impact of deploying the first deployment to the second endpoint by comparing the third values of the performance metric to the fourth values of the performance metric; and determine an overall impact of deploying the first deployment to the plurality of endpoints based at least on the first post-deployment impact and the second post-deployment impact.

15. The computer-readable storage medium of claim 13, wherein the computer-executable instructions, when executed by the processor, further cause the processor to:

determine, based on the telemetry information associated with the workloads executing on the plurality of endpoints, a second endpoint of the plurality of endpoints associated with a second periodic workload;

determine third values of the performance metric for the second endpoint, the third values associated with pre-deployment telemetry information generated prior to deploying a second deployment to the second endpoint, the second deployment differing from the first deployment in at least one feature;

determine fourth values of the performance metric fort the second endpoint, the fourth values associated with post-deployment telemetry information generated after deploying the second deployment to the second endpoint;

determine a second post-deployment impact of deploying the second deployment to the second endpoint by comparing the third values of the performance metric to the fourth values of the performance metric; and determine an impact of the at least one feature based at least on the first post-deployment impact and the second post-deployment impact.

16. The computer-readable storage medium of claim 13, wherein the performance metric comprises at least one of:

a query duration;

a query success rate;

a login success rate;

a memory utilization of frontend applications associated with the first endpoint;

a memory utilization of backend applications associated with the first endpoint;

a processor utilization of the frontend applications associated with the first endpoint; or a processor utilization of the backend applications associated with the first endpoint.

17. The computer-readable storage medium of claim 13, wherein the first action comprises at least one of:

undeploying the first deployment from the first endpoint;

modifying the first deployment based at least on the first post-deployment impact;

deploying the first deployment to additional endpoints of the plurality of endpoints; or generating a user interface element based at least on the first post-deployment impact.

* * * * *